UNITED STATES PATENT OFFICE.

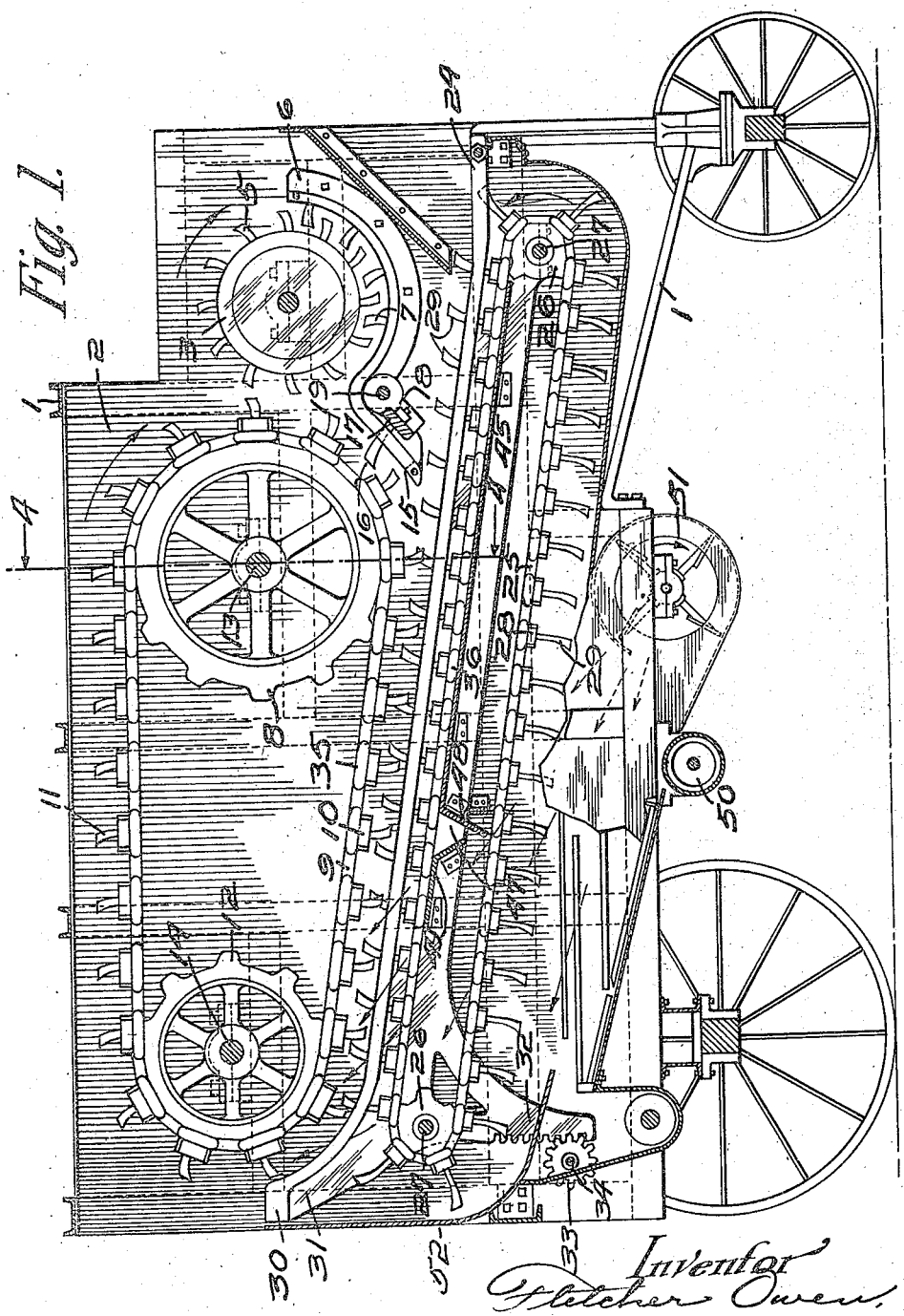

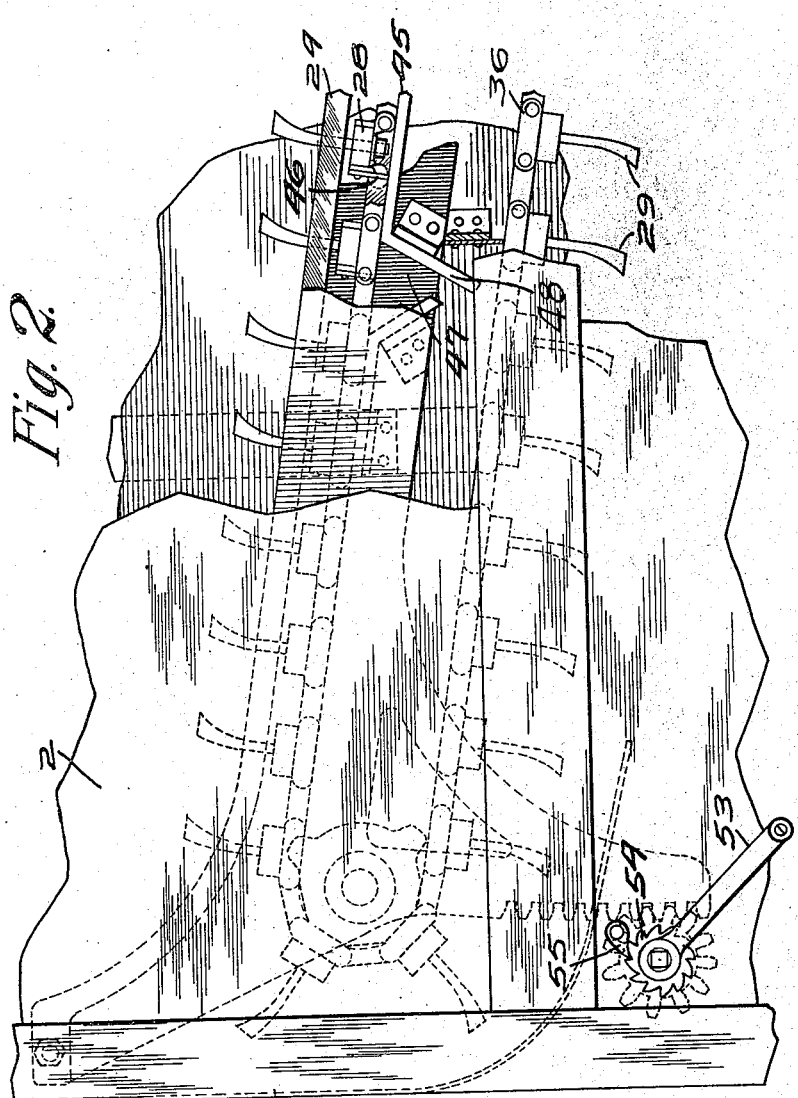

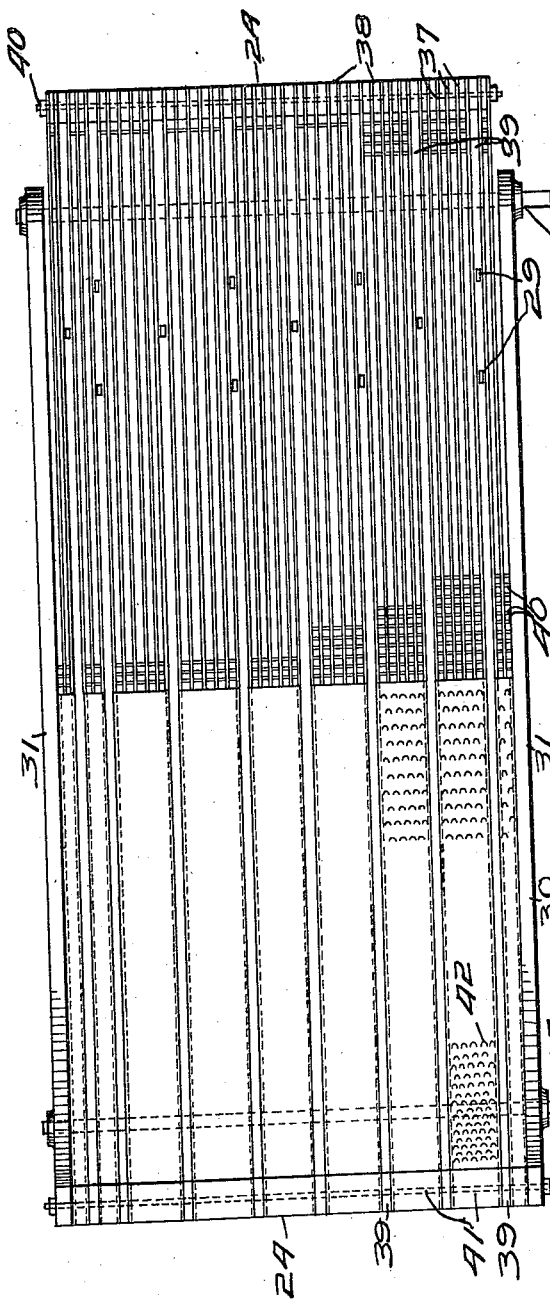

FLETCHER OWEN, OF TOLEDO, OHIO, ASSIGNOR TO F. NEWTON OWEN, OF TOLEDO, OHIO.

THRASHER.

1,426,498.

Specification of Letters Patent. Patented Aug. 22, 1922.

Application filed February 10, 1921. Serial No. 443,769.

*To all whom it may concern:*

Be it known that I, FLETCHER OWEN, a citizen of the United States, and a resident of Toledo, in the county of Lucas and State of Ohio, have made an Invention Appertaining to a Thrasher; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to produce a thrasher that is a grain and stalk separating means which will insure separation of practically all of the grain from the other parts of the plant. The invention also has for its object to provide an adjustable means for threshing and separating the grain from the straw according to the condition of the straw and the condition of the grain. The invention also has for its object other advantages and features that will appear from the following description, and upon examination of the drawings.

The invention may be contained in threshing machines or separating machines of different forms, and to illustrate a practical application of the invention I have selected a threshing machine for separating grain from the straw, as an example of machines containing my invention, and shall describe it hereinafter. The structure selected is illustrated in the accompanying drawings.

Figure 1 of the drawings is a vertical sectional view of the machine. Fig. 2 is a broken view showing details of construction of parts of the mechanism illustrated in Fig. 1. Fig. 3 illustrates a top view of a grid. Fig. 4 is a sectional view taken on the line 4—4 indicated in Fig. 1. Fig. 5 is a top view of an adjustable means to be used in connection with the beater according to the condition of the straw and of the grain. Fig. 6 is an end view of the device illustrated in Fig. 5. Fig. 7 is a broken view of a part of the rack, showing the construction of one end of the rack.

1 in the figures is the supporting frame that may be mounted on wheels in the manner well known in the art. The mechanism is enclosed within a wall or shell 2 of any suitable material. 3 is a beater or thrasher of any well known type. It consists of a wheel having prongs or teeth 5, that rotate at a comparatively high speed above a trough 6 which is provided with stationary prongs 7. The stalks having the grain are thrown into the threshing machine, and on or into engaging relation with the threshing cylinder 3 which, in the manner well known in the art, carries it down while the heads of the stalks are being struck by the prongs 5 and 7 of the beater 3 and of the trough 6 and thus the grain is beaten out.

In proximity to the beater 3 or thrasher proper is located a pair of sprocket wheels 8 which have a pair of chain belts 9 to which are attached cross bars 10. Each of the cross bars 10 is provided with prongs 11. The chains pass over the sprocket wheels 12. The wheels 12 are smaller than the wheels 8, and their common axis is located slightly above the common axis of the wheels 8 so that the lower side of the belt formed by the chains 9 and the cross bars 10 inclines upward from the lower sides of the wheels 8 to the lower sides of the wheels 12. The wheels 8 are supported on the shaft 13 and the wheels 12 are supported on the shaft 14. The shafts 13 and 14 are supported in suitable bearings located on the frame 1 of the machine.

The concave 6 is provided with an apron 15 extending along the delivery side of the trough, and the wheels 8 are so located that the prongs 11 pass in proximity to the apron 15. As the cylinder 3 beats the grain it is delivered over the apron 15 by the action of the prongs 5 located on the drum 3, and the prongs 11 draw the straw forward in a clock-wise movement toward the delivery end of the machine.

The apron 15 is located relative to the belt 35 formed by the chains 9 and the cross bars 10 so as to produce the most efficient results when the stalks and grain are dry, but if the stalks and grain are not in a sufficiently dry state, the movement of the straw is delayed and the grain is further beaten by the coaction of the prongs 11 and 16. The latter prongs 16 extend through the apron 15, and are located on a bar 17 that is pivotally supported beneath the apron 16 by means of the arm 18 and the rod or shaft 19. The arms 18 may be formed integral with the bar 17 so as to support the bar 17 on the rod 19 to which the arms 18 are keyed by means of the key bolts 20. A crank 21 may be located on the outside of the wall 2 of the machine, and connected to the rod 19 to move the prongs 16 into operative relation with respect to the prongs 11. A ratchet 22 may also be connected to the rod 19, and a dog 23 may be connected to the frame 1 of the machine, whereby the arms 18 may be raised and lowered to move the prongs 16 in adjustable relation to the apron 15.

The separation of the stalks and the grain takes place as the straw is moved over the grid 24, which is located in substantially parallel relation to the lower side of the belt 35. A pair of chains 25 connect the sprocket wheels 26 located on the shafts 27, and are provided with cross bars 28 having prongs 29 that extend through the grid 24. The prongs 11 and 29 manipulate the stalks and grain so as to permit practically all of the grain to pass through the grid.

The grid 24 is supported on a frame 30 having the side bars 31. One shaft 27 is supported at one end of the side bars 31, and the frame 30 is pivoted on the other shaft 27 which is supported in suitable bearings on the frame 1. The positions of the frame 30, and consequently of the grid 24, and the belt 36 formed by the chains 25 and the cross bars 26 are adjusted by means of the racks 32 that may be formed integral with the side bars 31 and the pinions 33 that are secured to the shaft 34. Rotation of the pinions 33 will raise and lower the frame 30 and the parts supported thereon. Rotation of the pinions 33 may be performed by the crank 53 and adjusted positions of the frame 30 may be obtained by securing the pinions 33 and the rack 32 in different relative positions by means of the ratchet 54 and the dog 55.

When the straw is not dry the grid and the belt formed by the chain 25 and the cross bars 28 is raised so as to more closely confine the straw delivered from the beater, and by the action of the prongs 11 and 29 further beat the grain so as to insure delivery of the grain from the straw. When the straw is dry the frame 30 is lowered since the grain is more easily separated from the straw and consequently there is less need of crowding the straw between the belts 35 and 36.

The rate of movement of the belt 35 is more rapid than the rate of movement of the belt 36, so that while the belt 36 permits forward movement of the straw yet it holds the straw back while it is being beaten by the prongs 11 of the belt 35. This operation takes place over the grid 24.

The grid is formed of a plurality of longitudinal bars 37 divided into sections 38 that are separated by spaces 39 through which the prongs 38 that are separated by spaces 39 through which the prongs 29 extend, and are carried from one end of the rack to the other end. The ends of the strip 37 are separated by suitable blocks and are connected together by means of the tie bolt and nut 40. The ends of the rack are located a short distance beyond the sprocket wheels 26 in order to permit the entrance and the exit of the prongs 29 into the spaces 39.

The strips 37 extend to about midway the length of the rack, and up to this point the strips of each section 38 are connected together by cross strips 40 whereby relatively large openings are formed in this portion of the rack to permit the free passage of the grain through the rack.

The other half of the rack is preferably formed of sheet metal and divided into sections 41 that are located intermediate the spaces 39 through which the prongs 29 travel. The sections are provided with semi-circular openings 42 as shown in Fig. 7, formed by making semi-circular cuts and forcing the metal within the area of the semi-circles downward to form downwardly extending lips 43 through which the grain may be allowed to fall, and through which air may be directed to carry the chaff and small straw forward in the direction that the bulk of the straw is carried by the prongs 11 and 29. The delivery end of the grid 24 is turned upward following for a distance the general direction of the prongs 11 as they are raised by the wheels 12, not however to exceed an elevation that will prevent an outward delivery of the straw and chaff.

The grain falls upon the board 45 that may be formed of sheet metal. The board 45 is supported on the frame 30, and the chains 25 ride on the edges of the board 45 which maintains the cross bars 28 in a parallel relation to the board 45 as they are carried along beneath the rack 24 as shown in Fig. 2. Each cross bar 28 is provided with a wiper 46 that is secured to the cross bar and extends to the board 45 when the cross bar is carried over the board. The wiper 46 may be formed of any suitable material, such as fabric, to collect and convey the grain to the hopper 47 that is formed in the board 45 and which is preferably located near the delivery end of the board, and slightly beyond the center of the length of the grid 24. The hopper 47 is formed by a downwardly extending part 48 of the board 45 and an angular cross piece 49, a portion of which is located in substantially the same plane as the board 45.

The grain and some of the chaff and small straw will thus pass through the hopper 47 and fall to the bottom of the machine, and may be conveyed to a suitable screw conveyor 50. The blower 51 is so positioned as to direct a stream of air across the falling grain so as to blow the chaff and small straw from the grain as the grain falls to the bottom of the machine. The machine is provided with a baffle plate 52 which delivers the current of air in an upward direction from the machine. The air will thus pass upward beneath the end of the board 45 and be caught by the lips 43 to blow the chaff and small broken straw along with the bulk of the straw that is conveyed forward by the belts 35 and 36, the baffle plate 52 confining the delivery of air largely to the area above the upturned end of the grid 24.

I claim:

1. In a threshing machine, a pair of belts having prongs, a grid located between the belts and having spaces through which the prongs of one of the belts extend and move in operative relation to the prongs of the other belt.

2. In a threshing machine, a pair of belts having prongs, a grid located between the belts and having spaces through which the prongs of one of the belts extend and move in operative relation to the prongs of the other belt, and means for separating the chaff from the grain as it is delivered from the grid.

3. In a threshing machine, a pair of belts having prongs, a grid located between the belts and having spaces through which the prongs of one of the belts extend and move in operative relation to the prongs of the other belt, a board located below the grid, one of the belts operating to convey the grain over the board.

4. In a threshing machine, a pair of belts having prongs, a grid located between the belts and having spaces through which the prongs of one of the belts extend and move in operative relation to the prongs of the other belt, a board located below the grid, one of the belts operating to convey the grain over the board, and a blower for separating the grain and the chaff as it falls from the end of board.

5. In a threshing machine, a pair of belts having prongs, a grid located between the belts and having spaces through which the prongs of one of the belts extend and move in operative relation to the prongs of the other belt, a board located below the grid, one of the belts operating to convey the grain over the board, a blower for separating the grain and the chaff as it falls from the end of the board, the grid having openings and lips located in advance of the openings and extending in a direction to engage the air current and direct it to the top of the grid.

6. In a threshing machine a beater, a pair of belts having prongs, a grid having openings through which the prongs of one of the belts extend and move in operative relation to the prongs of the other belt, means for adjusting the grid and the prongs extending therethrough relative to the prongs of the other of the belts.

7. In a threshing machine a threshing cylinder, a pair of belts having prongs, a grid having openings through which the prongs of one of the belts extend and move in operative relation to the prongs of the other belt, means for adjusting the grid and the prongs extending therethrough relative to the prongs of the other of the belts, an apron, prongs supported in the apron, and having means for changing the position of the prongs relative to the apron.

8. In a threshing machine, a threshing cylinder, a pair of belts having prongs, a grid having openings through which the prongs of one of the belts extend and move in operative relation to the prongs of the other belt, means for adjusting the grid and the prongs extending therethrough relative to the prongs of the other of the belts, an apron, prongs supported in the apron, and having means for changing the position of the prongs relative to the apron, a board located below the grid, one of the belts operated to convey the grain that passes through the grid to near the end of the board, a blower for separating the chaff from the grain as it falls from the board, and means for directing the air to the surface of the end of the grid to carry away the chaff and broken stalks together with the bulks of the stalks that are conveyed by the belts, and means for moving one of the belts faster than the other of the belts is moved to convey the stalks forward while the grain passes through the grid.

In testimony whereof, I have hereunto signed my name to this specification.

FLETCHER OWEN.